(12) United States Patent
Pelini (10) Patent No.: US 7,146,795 B2
(45) Date of Patent: Dec. 12, 2006

(54) SYSTEM AND METHOD FOR PRODUCING INJECTION-QUALITY STEAM FOR COMBUSTION TURBINE POWER AUGMENTATION

(75) Inventor: Robert Gino Pelini, Warren, PA (US)

(73) Assignee: RGP Engineering LLC, Warren, PA (US)

( * ) Notice: Subject to any disclaimer, the term of this patent is extended or adjusted under 35 U.S.C. 154(b) by 0 days.

(21) Appl. No.: 10/457,593

(22) Filed: Jun. 9, 2003

(65) Prior Publication Data

US 2003/0226348 A1 Dec. 11, 2003

Related U.S. Application Data

(60) Provisional application No. 60/386,723, filed on Jun. 10, 2002.

(51) Int. Cl.
*F02C 3/30* (2006.01)
(52) U.S. Cl. .................... 60/39.55; 60/39.182
(58) Field of Classification Search ............ 60/39.182, 60/39.53, 39.54, 39.55, 39.58, 39.59; 122/476
See application file for complete search history.

(56) References Cited

U.S. PATENT DOCUMENTS

| | | | | |
|---|---|---|---|---|
| 1,948,537 A | * | 2/1934 | Noack | 122/24 |
| 3,201,232 A | * | 8/1965 | Their | 420/105 |
| 6,370,862 B1 | * | 4/2002 | Cheng | 60/39.55 |
| 6,446,440 B1 | | 9/2002 | Ranasinghe et al. | |

OTHER PUBLICATIONS

Baumeister et al. Mark's Mechanical Engineering Handbook; Mcgraw-Hill, New York, 1958. p. 9-48.*
Nakhamkin, M. et al. *Injecting Humidified and Heated Air to Meet Peak Power Demands*, ASME Turbo Expo 2000: Land, Sea and Air, May 8-11, 2000, Munich, Germany.
*Cogeneration—Technology Profile (Chapter 2.2)*, www.energytech.at/(en)/kwk/portrait_kapitel-2_2.html, printed Mar. 8, 2005.
Innovative Steam Technologies, *OTSG/HRSG Description*, www.otsg.com.
Nakhamkin, M. et al., *Humid Air Injection Power Augmentation Technology has Arrived*, ASME Turbo Expo 2003: Land, Sea and Air, Jun. 16-19, 2003, Atlanta, Georgia.
Innovative Control Systems, Inc., *Gas Turbine Upgrades: Water Injection*, www.icsworldwide.com, printed on Mar. 8, 2005.

* cited by examiner

*Primary Examiner*—L. J. Casaregola
(74) *Attorney, Agent, or Firm*—Pepper Hamilton LLP; W. Joseph Melnik (57) ABSTRACT

The present invention is a combustion turbine assembly connected to a steam generator which utilizes deaerated potable water. The steam formed by the steam generator may be combined with air and injected into the combustor of the combustion turbine assembly to increase the mass flow of gas through the turbine for power augmentation. The deaeration of the feed water to the steam generator eliminates the need to demineralize the water and eliminates the use of more costly alloys for heat exchanger components of a steam generator.

17 Claims, 6 Drawing Sheets

Prior Art

SYSTEM AND METHOD FOR PRODUCING INJECTION-QUALITY STEAM FOR COMBUSTION TURBINE POWER AUGMENTATION

CROSS REFERENCES TO RELATED APPLICATIONS

This application claims priority from U.S. Provisional Application Ser. No. 60/386,723 filed Jun. 10, 2002 the contents of which are incorporated herein by reference in their entirety.

BACKGROUND

It is known that the power output of combustion turbines and associated power generators is dependent upon the ambient temperature of the air as well as its pressure. Reduced pressure and increased ambient air temperature have the effect of reducing mass flow of gas through the combustion turbine resulting in decreased power output for the combustion turbine driving the generator. The power output of a combustion turbine (CT) may be enhanced by various methods including inlet air humidification, inlet air cooling, and injection of superheated steam or superheated humidified air into the combustor of the combustion turbine. Generally these techniques increase the mass flow of gas through the combustion turbine to offset low air density due to an increased ambient air temperature or reduced pressure for high elevation installations.

Steam that is injected into a combustion turbine must be of sufficient purity so that the blades of the turbine will not be damaged. The major concern is nonvolatile or condensable matter, such as entrained solid particles or dissolved material that may be deposited on the turbine blades or could melt in the combustor and deposit on the turbine blades. When steam or humidified air is injected into the combustor of a combustion turbine to enhance power output, it must have a very low entrained solids content. The specific limit for solids content depends upon the turbine design, the purity of the intake air, and the purity of the fuel, among other variables. A typical solids concentration limit for a combustion turbine with humidified air injection (CT-HAI) is 0.5 ppm solids by mass in the injection stream.

The common method for generating injection-quality steam for a CT without an existing heat recovery steam generation (HRSG) is to use demineralized water and a once-through boiler/superheater. Due to the capital cost of a demineralized water system and its associated operating cost, steam generated in this manner has been used more typically for emissions control than for power augmentation. For CT-HAI, a requirement of demineralized water adversely affects project economics.

Figure 3:
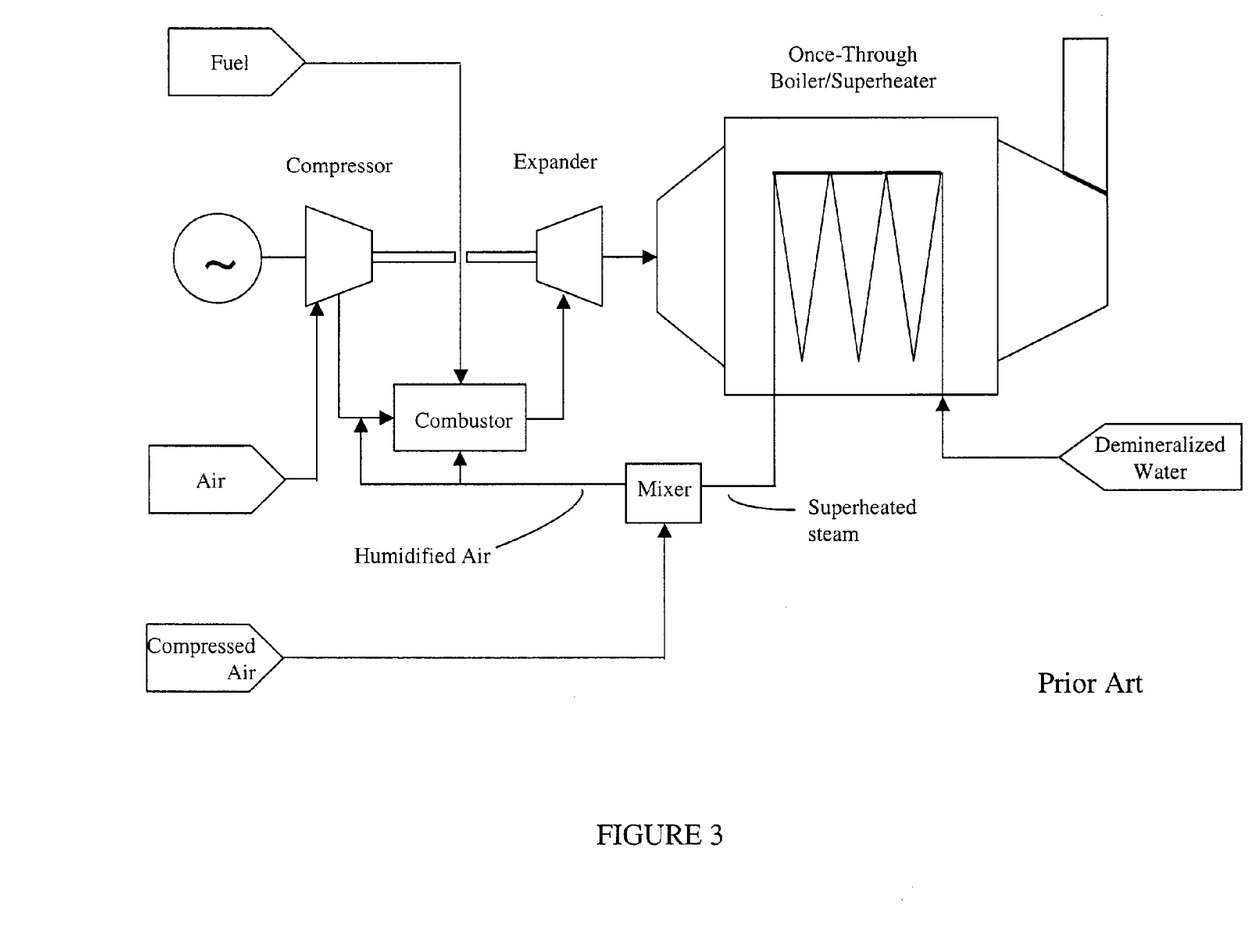
FIG. 3. is a schematic diagram of a combustion turbine with humidified air injection utilizing demineralized water and a once-through boiler.

Humidified air may be added to a combustion turbine using demineralized water fed into a once-through boiler/superheater to produce superheated steam for mixing with compressed air and subsequent injection into the combustor of the combustion turbine. The boiler/superheater may utilize hot exhaust gas from the turbine, a heat recovery unit, to superheat the water. A schematic diagram of a CT-HAI cycle using demineralized boiler feed water (BFW) is shown in FIG. 3. In this system, all demineralized water fed into the once through boiler/superheater is converted directly into superheated steam, mixed with compressed air, and fed to the turbine. The steam is only as pure as the demineralized feed water from which it is formed. This requires a high degree of demineralization, and a lack of chemical additives and corrosion inhibitors in the water requires the boiler tubes to be of costly alloy construction.

Figure 4:
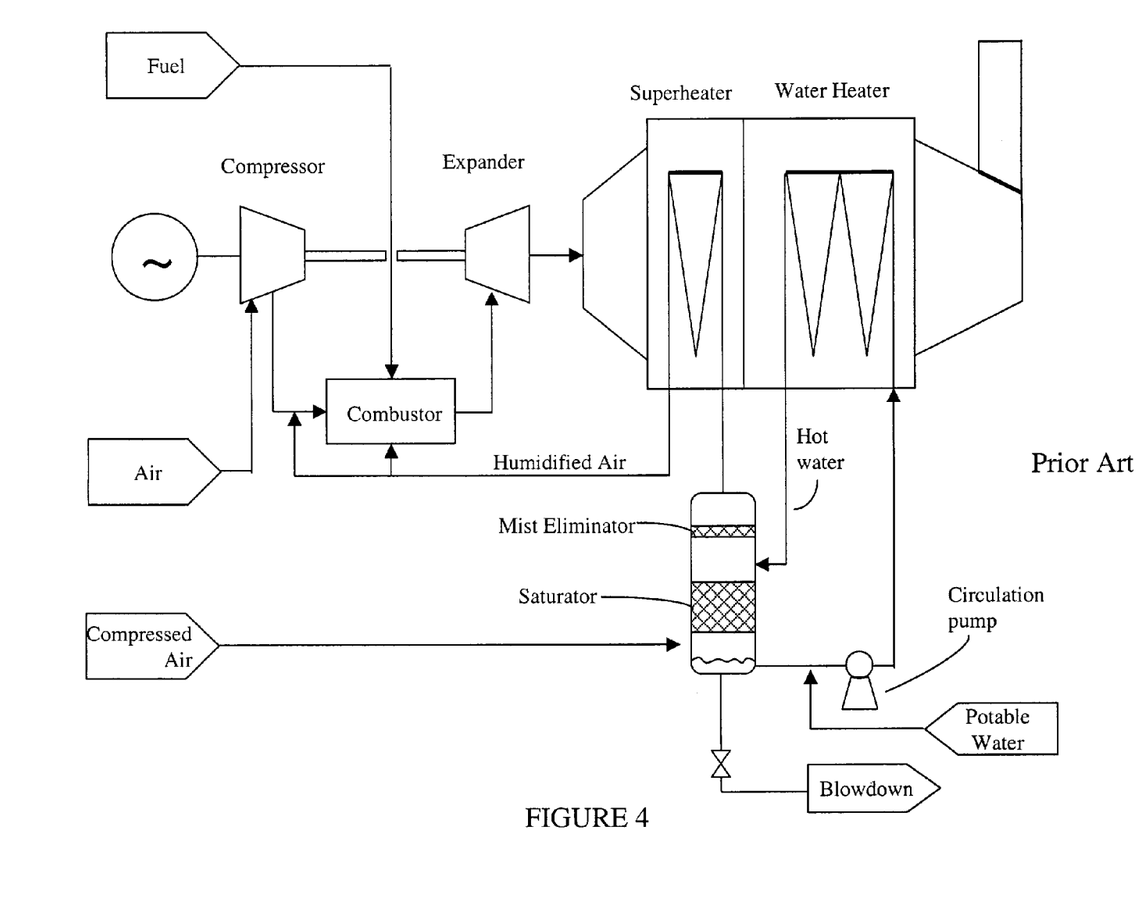
FIG. 4 is a schematic diagram of a combustion turbine with humidified air injection utilizing demineralized water and a saturator.

To avoid the economic disadvantages of demineralized water when using the large water flows required for power augmentation, the saturator concept was developed. While it is a suitable technical solution, it requires a costly saturator vessel and high-alloy water heater tubes, while adding system complexity. Rather than once-through boiling and superheating the steam, humidified air may be added to a combustion turbine using a saturator. A combustion turbine humidified air injection (CT-HAI) system with a saturator is shown in FIG. 4. Such a saturator system may be used in a combustion turbine humidified air injection system with softened, potable feed water. In the saturator system, potable aerated water is heated by re-circulation through a loop including a water heater coil, a pump, and a saturator. Compressed air is fed into the saturator and as the water is contacted with air in the saturator, the water evaporates to form humidified air. As water is evaporated, the dissolved solids concentration in the unvaporized, recirculating liquid water will increase. The concentration of total dissolved solids (TDS) is limited to acceptable levels in this unevaporated water by continuous or periodic blowdown of water from the saturator, typically about 20% of the water feed rate. Make-up water is fed to the system to balance the outflow of water in the humidified air and the blowdown streams. The humidified air leaving the saturator will carry off small droplets of water containing dissolved solids, but the mass flow of droplets exiting the saturator will usually be on the order of 0.05% of the humidified air flow. If the blowdown rate is adjusted to produce a total dissolved solids (TDS) concentration of, say, 1000 ppm in the saturator, then the solids carried out by the droplets in the humidified air will amount to 0.5 ppm by mass in the humidified air stream, which is sufficiently pure for almost all combustion turbine injection applications. The humidified air leaving the saturator is subsequently superheated before being injected into the combustion turbine CT combustor. The superheater may utilize hot exhaust gas from the turbine to superheat the water.

The heating of aerated water to the range of about 350° F. to about 500° F. as is typical for the water heater portion of the saturator requires an oxidation-resistant alloy for heat exchanger or water heater tubes. Austenitic stainless steels (304, 316, etc.) have acceptable oxidation resistance, but they are not suitable for use in the water heater because of their lack of resistance to chloride stress corrosion cracking (SCC), which particularly affects austenitic stainless steels. Duplex stainless steels such as Alloy 2205 have reasonable resistance to chloride stress corrosion cracking, but duplex alloys cannot be used for the water heater tubes because of embrittlement problems if exposed to temperatures above about 885° F. (474° C.). The American Society of Mechanical Engineers (ASME) Boiler and Pressure Vessel Code does not permit the use of ferritic stainless steels or duplex stainless steels for design temperatures above 600° F. (315.5° C.) because of this reason. Since the water heater or heat exchanger of a combustion turbine with humidified air injection (CT-HAI) is not always in service, the tubes in such a heat exchanger could be heated by the hot turbine exhaust to temperatures exceeding 1100° F. (593° C.). The requirements for oxidation resistance, chloride stress corrosion cracking ("SCC") resistance, and no irreversible deterioration of physical properties at temperatures exceeding 1100° F. (593° C.) generally require the use of a costly high-nickel alloy, such as Alloy 625 or Alloy G, for the water heater tubes.

There exists a need for an apparatus and method of making superheated steam, or steam-air mixtures, for combustion turbines that does not require expensive alloys for construction of heat exchangers, demineralizers for purifying water, or expensive pumps for re-circulating water in saturator feed loops.

SUMMARY

The innovation described here utilizes a deaerator and once-through partial steam generator, and permits the use of potable water or even lower grades of water without the need for a saturator vessel. It also requires less costly materials of construction in the combustion turbine (CT) heat recovery equipment.

The present invention may be used with combustion turbine steam injection (CT-SI) or combustion turbine humidified air injection (CT-HAI) in combustion turbines without a combined-cycle heat recovery steam generator (HRSG). The present invention may also be used in a combined-cycle HRSG, if economic considerations warrant such an application.

The present invention may be used to provide two modes of operation including a simple-cycle combustion turbine mode of operation and an electrical power augmentation mode of operation.

One embodiment of the present invention is a combustion turbine that includes a compressor, a combustor, and an expansion turbine. The expansion turbine is operatively coupled to drive the compressor and an electric generator. The combustion turbine also includes a steam generator structure in fluid communication with the combustor. The steam generator includes a source of deaerated water and a boiler for heating the deareated water and producing a steam and water mixture. A vapor/liquid separator is in fluid communication with the boiler and is arranged to receive the mixture of steam and water from the partial once-through boiler and to separate the fluid mixture into steam and liquid water. A superheater heat exchange section is fluidly connected to the fluid separator, steam from the separator flows into the superheater for superheating the steam. The superheater is in fluid communication with the combustor and the superheated steam flows or is injected into the combustor. The combustion turbine may further include a deareator for removing dissolved oxygen and other gases from a source of potable water connected to the steam generator structure; the deaerator produces deaerated water for heating and partial evaporation of the water in the once-through boiler.

The separator may include a mist eliminator as well as a port for elimination of the water from the separator. The separator may be connected to a source of compressed air for combining the steam and the air prior to superheating the steam-air mixture.

One embodiment of the present invention is a combustion turbine assembly with a supplemental compressed air structure and a steam generator. The combustion turbine assembly includes at a shaft assembly having at least one compressor and at least one expansion turbine and a combustor that directs heated combustion product gas to the expansion turbine. The expansion turbine is coupled through the shaft to drive the compressor and the expansion turbine is also coupled with an electric generator. The compressor is in fluid communication with an inlet to the combustor via a flow path structure, with the compressor/expander/generator set being optimized for operation across a range of ambient temperatures and pressures, developing maximum power output at the lowest temperatures and highest pressures. At higher ambient temperatures, or at lower ambient pressures, the power output is reduced, but the expander and generator have the capacity to provide electric power exceeding the power output possible given the limitation of the air mass flow through the compressor. In some cases, such as in instances of higher ambient temperature, the generator may be cooled to increase its maximum power output and permit maximum expander power augmentation. The steam generator includes a potable water source or aqueous solution in fluid communication with a deaerator to remove dissolved gases such as air from the potable water or aqueous solution. The deaerated water is fed to a boiler structure constructed and arranged to partially form a mixture of steam and liquid. The mixture of steam and liquid including water from the boiler structure enters a steam-water separator, which may have a mist eliminator, constructed and arranged to separate steam from the steam-water mixture. A portion of the steam is returned to the deaerator where it heats and deaerates the potable water. Steam in the separator flows to a superheater structure where it is superheated while the liquid water in the separator (containing dissolved or entrained solids) is discharged as blowdown. The superheated steam is injected into the combustor and increases the mass flow of gas to the expansion turbine.

In another embodiment the separator is connected to a mixer for combining compressed air from a supplemental compressed air source with the steam from the steam-water separator. After they are combined, the steam-air mixture flows into the superheater structure where its temperature is increased. The superheated steam-air mixture is injected into the combustor and increases the mass flow of gas to the expansion turbine. Alternately, the air may be mixed with the steam from the steam-water separator downstream of the superheater. This alternate approach requires superheating the steam to a higher temperature so, when it is combined with the lower temperature air, the resulting steam-air mixture will be of sufficiently high temperature. This alternate embodiment may be particularly advantageous in certain installations, such as where the system was originally built for system injection only, but was later converted to steam-air injection.

One embodiment of the present invention is a method of increasing the mass flow to an expansion turbine. The method includes the acts of heating a deaerated aqueous solution to form a mixture of steam and liquid water and then separating said mixture of steam and liquid water in a separator. The steam from the separator is heated to form superheated steam which is then delivered or injected into the combustor of a combustion turbine assembly. The method may further include the act of mixing air or another gas with said steam prior to or after superheating and the act of blowing down and eliminating from the separator the residual liquid water containing dissolved or entrained solid impurities.

The apparatus and methods of the present invention make superheated steam which may also include air, or other gas, for injection in a combustion turbine assembly and does not require expensive alloys for construction of heat exchangers. The present invention does not require the use of demineralizers or deionizers for purifying the feed water prior to heating, and eliminates expensive pumps for re-circulating water in saturator feed loops.

DESCRIPTION OF THE DRAWINGS

In part, other aspects, features, benefits and advantages of the embodiments of the present invention will be apparent with regard to the following description, appended claims and accompanying drawings where:

DETAILED DESCRIPTION

Before the present apparatus and methods are described, it is to be understood that this invention is not limited to the particular molecules, systems, devices, compositions, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "combustor" is a reference to one or more combustors and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

The apparatus and methods of the present invention generate steam or steam-air mixtures (e.g. humidified air) for injection into the combustor of a combustion turbine assembly. The apparatus utilizes potable water which is deaerated and then heated to produce a mixture of steam and water in one stage of a heat exchanger. The mixture of steam and water produced enters a separator where the liquid water is removed as blowdown and the steam flows into a superheater. The steam may be mixed with compressed air or other gas. The steam and air mixture can be superheated prior to injection into the combustor of a combustion turbine. Alternately, the steam may be superheated prior to being mixed with the compressed air, although it will usually be necessary to superheat the steam to a higher temperature to compensate for the usually lower temperature of the compressed air.

Figure 1:
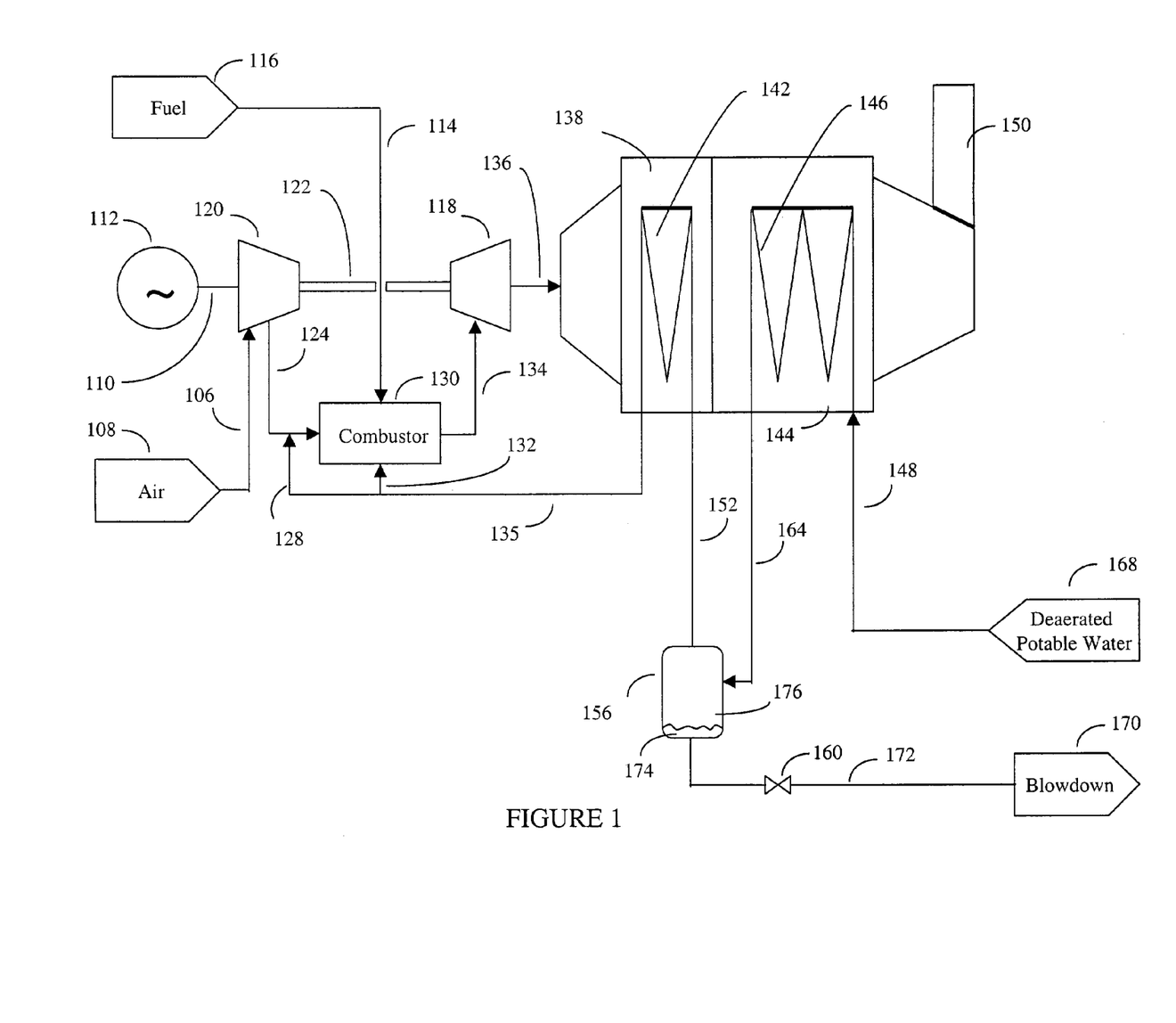
FIG. 1 is a schematic diagram of an embodiment of the present invention.

A schematic diagram of the system of the present invention is shown in FIG. 1. The combustion turbine includes a compressor 120, and expansion turbine 118, a combustor 130 which feeds heated combustion product gas via conduit 134 to the expansion turbine 118. The expansion turbine 118 is operatively coupled to drive the compressor 120 through shaft 122 and to also drive an electric generator 112 through shaft 110. A source of fuel 116 is fed through conduit 114 into the combustor 130. A source of air 108 can be fed into the compressor 120 through conduit 106 in fluid communication with the compressor 120.

In the system of the present invention, a source of deaerated water may be heated in carbon steel or chrome-moly tubes in heat exchanger 146, which are not susceptible to chloride stress corrosion cracking. Generally, chrome-moly or other similar alloy may be used for heat exchanger tubes to withstand oxidation during the 1100° F. (593° C.) "idle mode" situation. A source of deaerated water 168 flows through conduit 148 into heat exchanger tubes 146 where it is heated in a once-through partial boiler 144. Instead of completely evaporating boiler feed water as in the traditional once-through boiler/superheater concept, the deareated water in the heat exchanger tubes 146 is only partially evaporated in a once-through partial boiler 144. Typically the partially evaporated liquid is in the range of about 50% to about 90% by mass steam and is preferably in the range of about 75% to about 85% by mass steam. This mixture is separated in separator 156 into steam 176 and water 174. The remaining unevaporated water 174 in separator 156 may be separated out and discarded as blowdown 170 through valve 160 which is opened and conduit 172. As shown, the heat exchanger 146 uses waste heat from the turbine to make the water and steam mixture in 146, however, any heater or source of energy capable of making the mixture of water and steam may be used. The deareated water 168 flow through conduit 148 to the once through partial boiler 146 is controlled so as to limit the total dissolved solids concentration of the steam 176.

The steam 176 in separator vessel 156 may flow through conduit 152 into heat exchanger 142 in superheater 138 where it is superheated. As shown the superheater 138 uses waste heat from the turbine 118 to superheat the steam 176 however, the heat exchanger may utilize any heater or source of energy capable of superheating the steam 176. The superheated steam flows through conduit 135 and may be delivered directly to the combustor 130 through conduit and/or injector 132 where it may be mixed with air 108 from the compressor 120 within the combustor 130. Alternatively the superheated steam flows through conduit 135 and may be delivered to the combustor 130 through conduit and/or injector 128 into conduit 124 where it may be mixed with air 108 from the compressor 120 prior to introduction into the combustor 130

Figure 2:
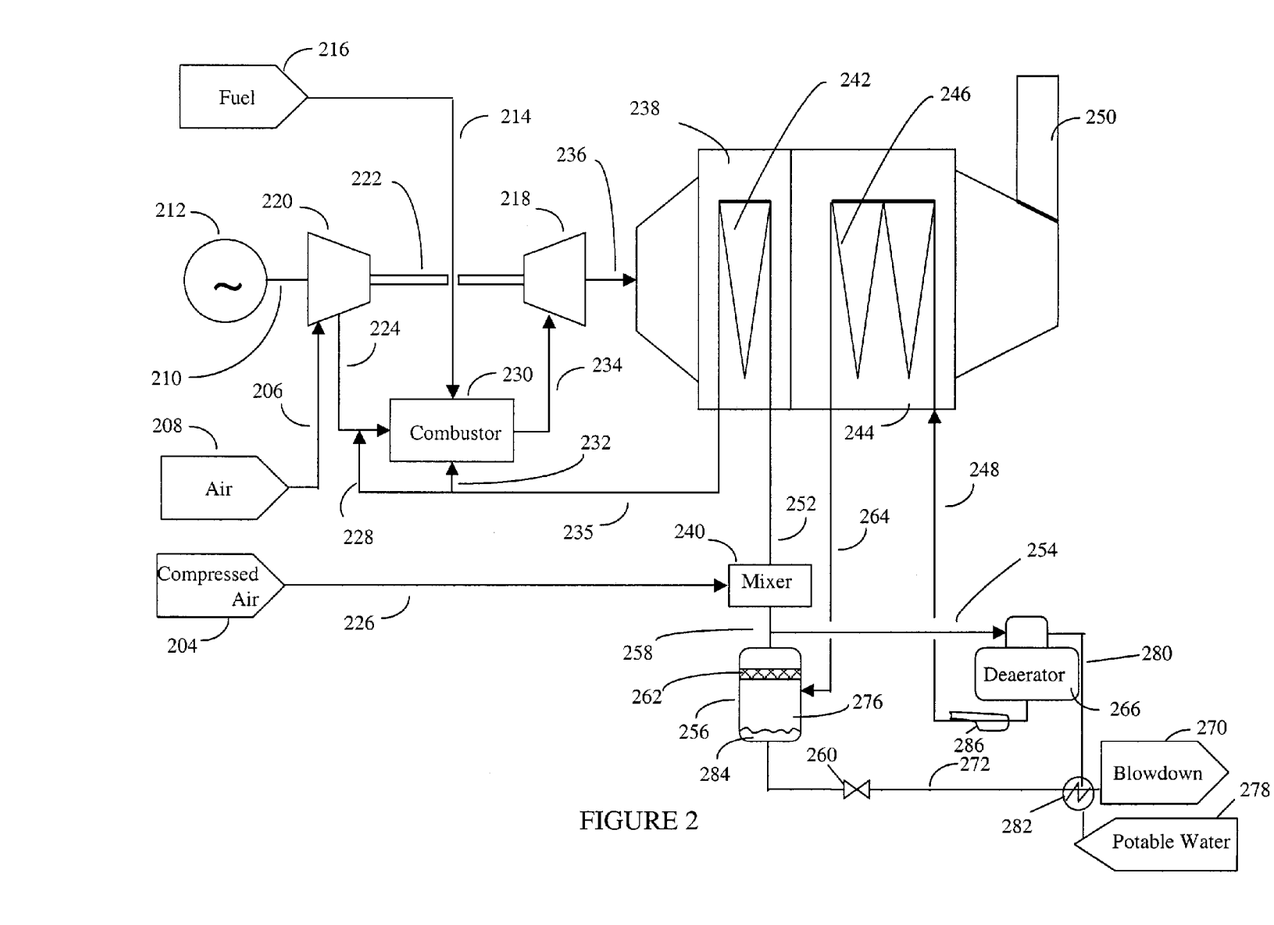
FIG. 2 is a schematic diagram of another embodiment of the present invention.

In FIG. 2 of the present invention, a source of potable water 278 is deaerated to remove dissolved oxygen as well as other gases from the potable water 278 using deaerator 266. The source of potable water 278 is connected to deaerator 266 by conduit 280. Optionally, a heat exchanger 282 may utilize the excess heat of the blowdown 270 to heat the potable water before it is introduced to deaerator 266, although use of a heat exchanger 282 is not a necessary part of the present invention. The deaerated water may be heated in carbon steel, chrome-moly, or similar tubes in heat exchanger 246, which are not susceptible to chloride stress corrosion cracking. The deaerated potable water is pumped by a pump 286, such as a boiler feedwater pump, through conduit 248 into heat exchanger 246 where it is heated in once through partial boiler 244. Instead of completely evaporating the deaerated potable water as in the traditional once-through boiler concept, the deaerated potable water in 246 is only partially evaporated in a once-through partial boiler 244 to a fluid which is in the range of about 50% to about 90% by mass steam and more preferably a fluid which is in the range of about 75% to about 85% by mass steam. This fluid mixture is separated in separator 256 into steam 276 and a concentrated liquid potable water 284. The remaining unevaporated potable water 284 in separator 256 may be separated out and discarded as blowdown 270 by opening valve 260 and flowing the liquid 284 through conduit 272. The potable water 284 flows through conduit 248 to the once through partial boiler 246 is controlled so as to limit the total dissolved solids concentration in the steam 276.

Figure 5:
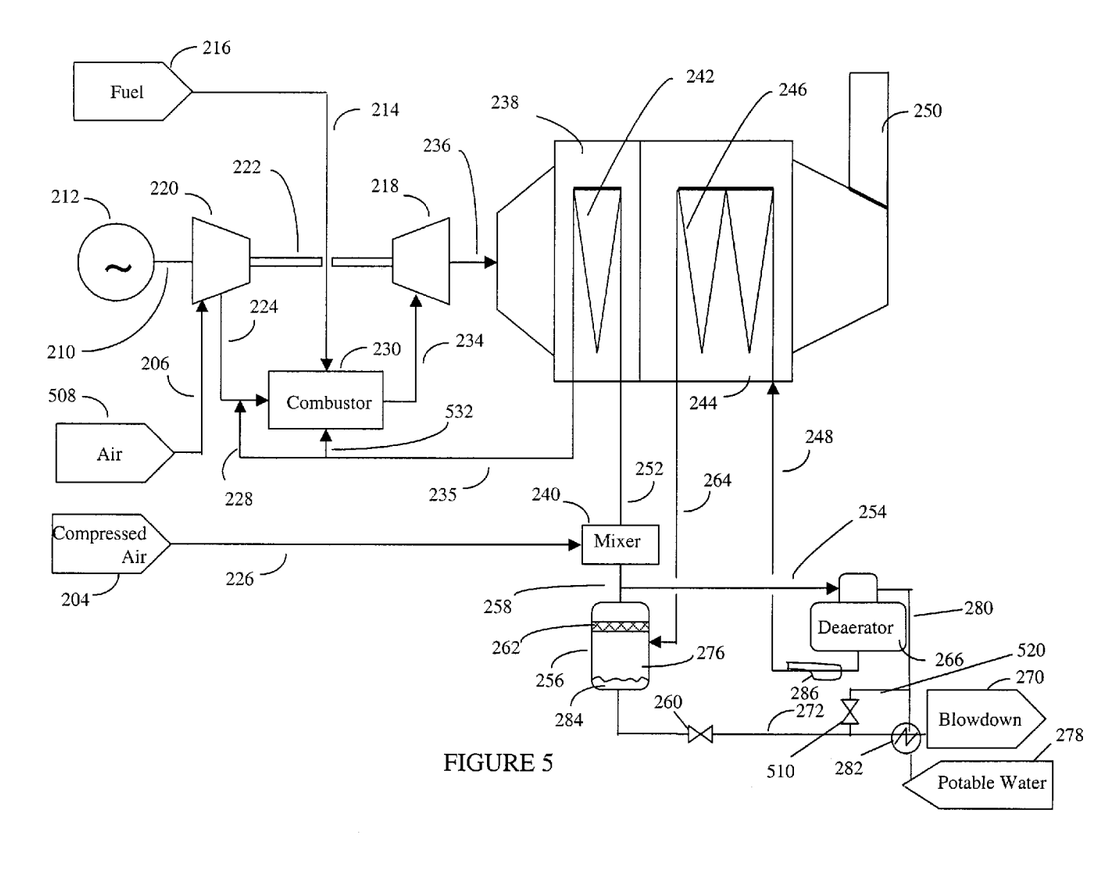
FIG. 5 is a schematic diagram of an alternate embodiment of the present invention where the blowdown is recycled.
Figure 6:
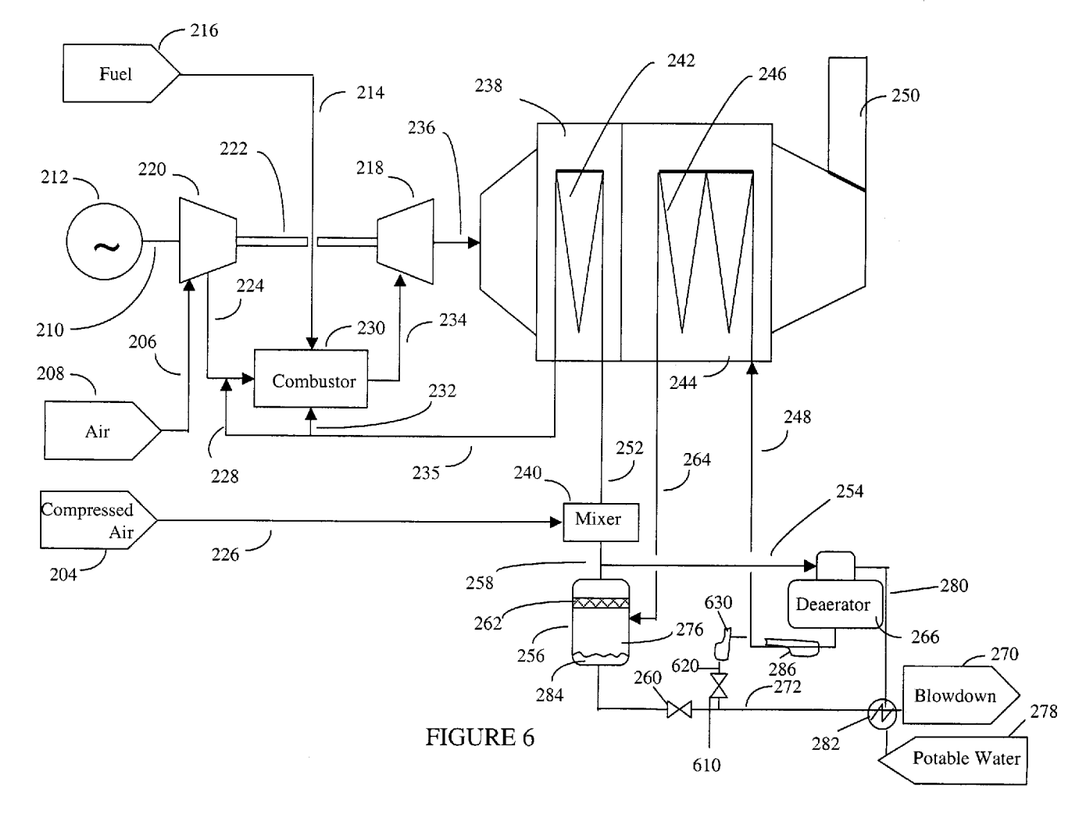
FIG. 6 is a schematic diagram of another alternate embodiment of the present invention where the blowdown is recycled.

Alternately, the remaining unevaporated potable water 284 may be reintroduced to the system as either an alternate or a complement to the potable water source 278. Typically, in such an alternate embodiment the remaining unevaporated potable water 284 would be reintroduced either prior to the deaerator 266, as shown in FIG. 5, or subsequent to the deaerator 266 but prior to introducing it to heat exchanger 246, as shown in FIG. 6. As shown in FIG. 5, recycling the unevaporated potable water 284 may be accomplished by placing a valve 510 along the blowdown conduit 272. When opened, the valve 510 allows the unevaporated potable water 284 to flow through conduit 520 to conduit 280 from which it is introduced to the deaerator 266. This system may be utilized when leaks or other imperfections are expected in the system which would contaminant the unevaporated potable water 284 with gases requiring deaeration. As shown in FIG. 6, recycling the unevaporated potable water may also be accomplished by placing valve 610 along the blowdown conduit 272. When opened, the valve 610 allows the unevaporated potable water 284 to flow through conduit 620 to a pump 630, such as a boiler water forced-circulation pump, to conduit 248 from which it is introduced to the heat exchangers 246.

The deaerator preferably uses a portion of the heated steam 276 flowing through conduit 254 to deaerate the potable water 278. Other degassers may be used to deaerate the potable water as would be known to those skilled in the art including but not limited to inert gas sparging of the water or removal of dissolved gases from the water using porous membranes.

The steam and liquid water separator vessel 256 may also include a mist eliminator 262 which may be used to provide steam with about 0.1% to about 0.01% by mass entrained droplets and preferably less than about 0.05% by mass entrained droplets. Both the concentration of total dissolved solids in the droplets and the droplet entrainment rate in the steam 276 will result in a typical solids concentration of less than about 2 $ppm_{w/w}$ and preferably less than about 0.5 $ppm_{w/w}$ total solids content in the steam delivered to the combustor 230. This steam 276 may be directly heated in 242, or the steam 276 may be mixed with a source of compressed air 204 in fluid communication through conduit 226 with steam 276 in a mixer 240. The addition of a gas including air further diluting the solids concentration and producing a steam-air mixture that is superheated in the heat exchanger tubes 242 in the superheater 238. A portion of the steam 276 from the vapor water saturator 256 is returned by a manifold 258 in fluid communication with conduit 254 to the deaerator 266. The steam 276 and optionally including a gas such as air flows through conduit 252 into heat exchanger 242 in superheater 238 where it is superheated. The superheated steam flows through conduit 235 and may be delivered directly to the combustor 230 through conduit and/or injector 232 where it may be mixed with air 208 within the combustor 230. Alternatively the superheated steam flows through conduit 235 and may be delivered directly to the combustor 230 through conduit and/or injector 228 into conduit 224 where it may be mixed with additional air 208 from the compressor 220 prior to introduction into the combustor 230.

The compressed gas delivered to the mixer of the present invention with the steam may be any chemically compatible gas useful for increasing the mass flow of the expansion turbine. Preferably the gas is compressed air delivered to the mixer from a pressurized source which may include but is not limited to a compressor, a storage vessel or other cylinder source of air. The present invention may be employed for example in the system disclosed in U.S. Pat. No. 6,305,158, the contents of which is hereby incorporated by reference into this specification. For example the compressed air storage shown of U.S. Pat. No. 6,305,158 may be used in place of 204 in FIG. 2 to supply compressed air to the mixer of the present invention to combine with the steam 276 generated from the once through boiler 244 of the present invention.

Potable water as used in the present invention generally an aqueous solution and may include dissolved salt and minerals, water softeners or corrosion inhibitors.

Superheated steam is steam which is heated to a temperature above its boiling point temperature at the pressure of operation; in the present invention the steam may be heated a temperature greater than about the 700° F. (371° C.).

A once-through partial boiler, as used herein, would include a partial boiler, meaning less than 100% steam quality is generated, wherein a portion of the separated water may be recycled for use in the system.

One of the advantages of the once-through potable water partial boiler is elimination of expensive alloy tubes for the heat exchangers. The tube material for the once-through boiler with partial steam generation of the present invention may be chrome-moly steel instead of the much more expensive Alloy 625 or Alloy G tubes in the water heater required for the saturator or Alloy 800 or similar alloys as used in the once-through boiler/superheater systems of FIG. 3 and FIG. 4. This material cost savings at least offsets the cost of adding a deaerator and steam separator for the once-through partial steam generator. This tube material costs savings more than offsets the cost of the deaerator that is used with the partial steam generator of the present invention, so that overall capital costs for the heat recovery system can be reduced.

The present invention eliminates the need for a system to de-mineralized the feed water and instead uses only a simple water softener. This saves substantially in both the capital cost and the operating cost for full-time engineering supervision for a de-mineralized water system.

The present invention does not require a saturator with its re-circulation associated pumps saving about 15% of the capital cost of a typical combustion turbine humidified air injection system. Any pumps for the once-through partial steam generator may be of conventional pump materials, while the piping and valves may be of carbon steel. The pumps, piping, and valves in the saturator system in FIG. 4 must be of a more expensive material providing both oxidation and chloride SSC resistance such as a ferritic stainless steel or a duplex stainless steel. In either case, the use of a once-through partial steam generator of the present invention with deaerated water will eliminate materials suitability concerns and reduce capital costs for pumps, piping, and valves. System complexity, material and maintenance requirements of the present invention are minimized by eliminating the saturator.

The present invention has significantly lower operating cost compared to a once-through boiler with demineralized water at comparable capital cost. The use of a once-through boiler with partial water evaporation and blowdown of the unevaporated water results in the production of high-purity steam or humidified air with roughly equivalent operating costs as in the saturator concept (both use potable water and they have an equivalent water blowdown rate), but with the present invention having lower capital cost and less complexity of operation.

Although the present invention has been described in considerable detail with reference to certain preferred embodiments thereof, other versions are possible. Therefore, the spirit and scope of the appended claims should not be limited to the description and the preferred versions contain within this specification.

What is claimed:

1. A system for generating steam for a combustion turbine comprising:
   a deaerated water source connected to a partial boiler, wherein the partial boiler partially evaporates deaerated water creating a steam-liquid mixture;
   a separator connected to the boiler, wherein the separator separates the steam-liquid mixture into a steam component and a liquid component, said separator connected to a port to separate out the liquid component; and
   a superheater connected to the separator, wherein the superheater heats the steam component to a desired temperature and delivers the heated steam component to a combustion turbine connected to the superheater,
   wherein the partial boiler is connected to the combustion turbine to receive waste heat from the combustion turbine.

2. A system for generating steam for a combustion turbine comprising:
   a deaerated water source connected to a partial boiler, wherein the partial boiler partially evaporates deaerated water creating a steam-liquid mixture;
   a separator connected to the boiler, wherein the separator separates the steam-liquid mixture into a steam component and a liquid component, said separator connected to a port to separate out the liquid component; and
   a superheater connected to the separator, wherein the superheater beats the steam component to a desired temperature and delivers the heated steam component to a combustion turbine connected to the superheater,
   wherein the superheater is connected to the combustion turbine to receive waste heat from the combustion turbine.

3. A system for generating steam for a combustion turbine comprising:
   a deaerated water source connected to a partial boiler, wherein the partial boiler partially evaporates deaerated water creating a steam-liquid mixture;
   a separator connected to the boiler, wherein the separator separates the steam-liquid mixture into a steam component and a liquid component, said separator connected to a port to separate out the liquid component; and
   a superheater connected to the separator, wherein the superheater heats the steam component to a desired temperature and delivers the heated steam component to a combustion turbine connected to the superheater,
   wherein the deaerated water source comprises: a potable water source; and a deaerator connected to receive liquid from the potable water source.

4. The system of claim 3 further comprising a heat exchanger connected to the potable water source wherein said heat exchanger utilizes waste heat to beat liquid from the potable water source prior to introducing the liquid to the deaerator.

5. The system of claim 3 wherein the potable water source is a public water system.

6. A system for generating steam for a combustion turbine comprising:
   a deaerated water source connected to a partial boiler, wherein the partial boiler partially evaporates deaerated water creating a steam-liquid mixture;
   a separator connected to the boiler, wherein the separator separates the steam-liquid mixture into a steam component and a liquid component, said separator connected to a port to separate out the liquid component; and
   a superheater connected to the separator, wherein the superheater heats the steam component to a desired temperature and delivers the heated steam component to a combustion turbine connected to the superheater,
   wherein the separator is a vessel that includes a mist eliminator, wherein the mist eliminator is effective at removing entrained droplets from the steam component.

7. The system of claim 6 wherein the mist eliminator is effective at removing entrained droplets from the steam component such that the steam component comprises less than about 0.1% by mass entrained droplets.

8. A system for generating steam for a combustion turbine comprising:
   a deaerated water source connected to a partial boiler, wherein the partial boiler partially evaporates deaerated water creating a steam-liquid mixture;
   a separator connected to the boiler, wherein the separator separates the steam-liquid mixture into a steam component and a liquid component, said separator connected to a port to separate out the liquid component;
   a superheater connected to the separator, wherein the superheater heats the steam component to a desired temperature and delivers the heated steam component to a combustion turbine connected to the superheater,
   a compressed gas source; and
   a mixer connected to receive compressed gas from the compressed gas source and further connected to receive the steam component from the separator, wherein the mixer mixes the compressed gas with the steam component creating a steam-gas mixture which is delivered to the superheater.

9. A combustion turbine system for generating electric power comprising:
   a deaerated water source connected to a partial boiler, wherein the partial boiler partially evaporates liquid received from the deaerated water source creating a steam-liquid mixture;
   a separator connected to the partial boiler, wherein the separator separates the steam-liquid mixture into a steam component and a liquid component;
   a superheater connected to the separator wherein the superheater heats the steam component to a desired temperature;
   a combustor connected to the superheater to receive the heated steam component connected to a turbine and a compressor, wherein said combustor feeds heated gas to an expansion turbine;
   a fuel source connected to the combustor;
   a gas source connected to the compressor; and an electric generator connected to the compressor, wherein the superheater is connected to the turbine to receive waste heat from the turbine.

10. A combustion turbine system for generating electric power comprising:
- a deaerated water source connected to a partial boiler, wherein the partial boiler partially evaporates liquid received from the deaerated water source creating a steam-liquid mixture;
- a separator connected to the partial boiler, wherein the separator separates the steam-liquid mixture into a steam component and a liquid component;
- a superheater connected to the separator wherein the superheater heats the steam component to a desired temperature;
- a combustor connected to the superheater to receive the heated steam component connected to a turbine and a compressor, wherein said combustor feeds heated gas to an expansion turbine;
- a fuel source connected to the combustor;
- a gas source connected to the compressor; and
- an electric generator connected to the compressor, wherein the partial boiler is connected to the turbine to receive waste heat from the turbine.

11. A system for generating steam for a combustion turbine comprising: a deaerated water source connected to a partial boiler wherein the partial boiler partially evaporates deaerated water creating a steam-liquid mixture; a separator vessel connected to the partial boiler wherein the separator vessel separates the steam-liquid mixture into a steam component and a liquid component and wherein the partial boiler is connected to the combustion turbine to receive waste heat from the combustion turbine; and a superheater connected to the separator vessel wherein the superheater heats the steam component to a desired temperature and delivers the heated steam component to a combustion turbine connected to the superheater.

12. The system of claim 11 wherein: the superheater is connected to the combustion turbine to receive waste heat from the combustion turbine.

13. The system of claim 11 wherein the partial boiler comprises a heat exchanger constructed of materials resistant to chloride stress corrosion cracking.

14. The system of claim 11 wherein the partial boiler is a once-through partial boiler.

15. The system of claim 11 wherein the partial boiler comprises a heat exchanger constructed of materials resistant to oxidation at temperatures of up to about 1100° F.

16. The system of claim 11 wherein the deaerated water source comprises: a potable water source; and a deaerator connected to receive liquid from the potable water source.

17. The system of claims 11 further comprising: a compressed gas source; and a mixer connected to receive compressed gas from the compressed gas source and further connected to receive the steam component from the separator vessel, wherein the mixer mixes the compressed gas with the steam component creating a steam-gas mixture which is delivered to the superheater.

* * * * *

UNITED STATES PATENT AND TRADEMARK OFFICE
CERTIFICATE OF CORRECTION

PATENT NO. : 7,146,795 B2
APPLICATION NO. : 10/457593
DATED : December 12, 2006
INVENTOR(S) : Robert Gino Pelini

It is certified that error appears in the above-identified patent and that said Letters Patent is hereby corrected as shown below:

Column 8, line 25, insert --to-- before "a temperature".

Column 10, line 3, "beat" should be changed to --heat--.

Signed and Sealed this

Twenty-sixth Day of June, 2007

JON W. DUDAS
*Director of the United States Patent and Trademark Office*